(12) United States Patent
Choi et al.

(10) Patent No.: US 10,220,840 B2
(45) Date of Patent: Mar. 5, 2019

(54) VEHICLE AND METHOD FOR CONTROLLING THE SAME

(71) Applicant: Hyundai Motor Company, Seoul (KR)

(72) Inventors: Youn Seok Choi, Seoul (KR); Jee Yoon Suh, Incheon (KR)

(73) Assignee: Hyundai Motor Company, Seoul (KR)

(*) Notice: Subject to any disclaimer, the term of this patent is extended or adjusted under 35 U.S.C. 154(b) by 261 days.

(21) Appl. No.: 15/132,939

(22) Filed: Apr. 19, 2016

(65) Prior Publication Data

US 2017/0174210 A1  Jun. 22, 2017

(30) Foreign Application Priority Data

Dec. 22, 2015 (KR) .................. 10-2015-0183949

(51) Int. Cl.
*B60W 10/18* (2012.01)
*B60W 10/20* (2006.01)
(Continued)

(52) U.S. Cl.
CPC ............ *B60W 30/08* (2013.01); *B60W 10/18* (2013.01); *B60W 10/184* (2013.01);
(Continued)

(58) Field of Classification Search
CPC .... B60W 30/08; B60W 10/184; B60W 30/02; B60W 10/22; B60W 50/14; B60W 10/18;
(Continued)

(56) References Cited

U.S. PATENT DOCUMENTS

| 2008/0040000 A1* | 2/2008 | Chen ................. | B60G 17/0152 |
| | | | 701/38 |
| 2014/0222306 A1* | 8/2014 | Wanami ................ | B60K 28/14 |
| | | | 701/70 |

(Continued)

FOREIGN PATENT DOCUMENTS

| JP | 2000233738 A | 8/2000 |
| JP | 2002316629 A | 10/2002 |

(Continued)

*Primary Examiner* — Thomas Ingram
(74) *Attorney, Agent, or Firm* — Brinks Gilson & Lione

(57) ABSTRACT

Disclosed herein are a vehicle configured to prevent a collision and a control method thereof. The vehicle includes a chassis; a steering unit configured to change a direction of the chassis; a brake unit configured to adjust a braking force of the chassis; a detector configured to detect movement information of the chassis; and a controller configured to confirm a variation rate of movement of the chassis based on the detected movement information and configured to automatically control an operation of the steering unit and the brake unit when the confirmed variation rate is out of a reference range. When a collision occurs, the vehicle may automatically perform at least one of steering control, side braking control, or a damping control, and thus a secondary collision may be prevented, the incidence of additional injury may be reduced, the speed of the vehicle may be stably reduced or stopped, and the vehicle may be moved to a safe lane so that a stabilization time of the vehicle may be reduced.

13 Claims, 10 Drawing Sheets

(51) Int. Cl.
*B60W 10/22* (2006.01)
*B60W 30/02* (2012.01)
*B60W 30/08* (2012.01)
*B60W 50/00* (2006.01)
*B60W 50/14* (2012.01)
*B60W 10/184* (2012.01)

(52) U.S. Cl.
CPC ............ *B60W 10/20* (2013.01); *B60W 10/22* (2013.01); *B60W 30/02* (2013.01); *B60W 50/14* (2013.01); *B60W 2030/082* (2013.01); *B60W 2050/0071* (2013.01); *B60W 2050/0073* (2013.01); *B60W 2520/10* (2013.01); *B60W 2520/125* (2013.01); *B60W 2520/14* (2013.01); *B60W 2540/12* (2013.01); *B60W 2540/18* (2013.01); *B60W 2710/223* (2013.01)

(58) Field of Classification Search
CPC ............ B60W 10/20; B60W 2520/14; B60W 2520/252; B60W 2520/125; B60W 2520/10; B60W 2710/223; B60W 2540/18; B60W 2050/0073; B60W 2050/0071; B60W 2540/12; B60W 2030/082

See application file for complete search history.

(56) References Cited

U.S. PATENT DOCUMENTS

| | | | |
|---|---|---|---|
| 2016/0046266 A1* | 2/2016 | Hammoud | B60T 7/22 701/70 |
| 2016/0121884 A1* | 5/2016 | Ciotlos | B60W 30/085 701/41 |
| 2016/0272202 A1* | 9/2016 | Inomata | B60W 30/12 |

FOREIGN PATENT DOCUMENTS

| | | |
|---|---|---|
| JP | 2003-81074 | 3/2003 |
| JP | 2003182617 A | 7/2003 |
| JP | 2004345427 A | 12/2004 |
| JP | 2006178715 A | 7/2006 |
| JP | 2008080892 A | 4/2008 |
| JP | 4314140 | 5/2009 |
| JP | 5197572 B2 | 5/2013 |
| JP | 2015101240 A | 6/2015 |
| KR | 1997-0040576 | 7/1997 |
| KR | 10-0462746 | 10/2004 |
| KR | 20120106036 A | 9/2012 |
| KR | 101361661 B1 | 2/2014 |

\* cited by examiner

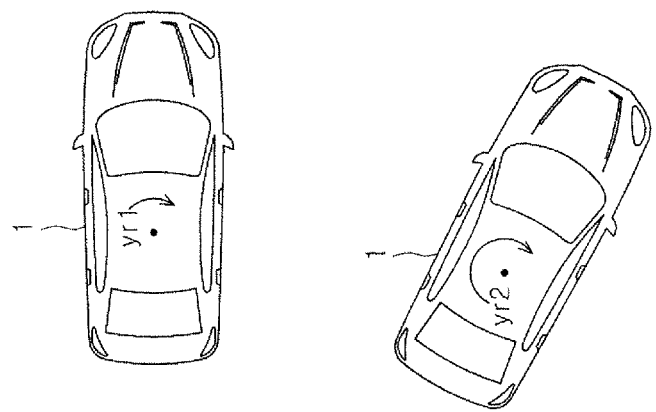
FIG. 4
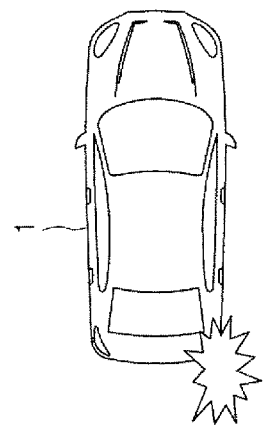

VEHICLE AND METHOD FOR CONTROLLING THE SAME

CROSS-REFERENCE TO RELATED APPLICATION(S)

This application claims the benefit of Korean Patent Application No. 10-2015-0183949, filed on Dec. 22, 2015 in the Korean Intellectual Property Office, the entire disclosure of which is incorporated herein by reference.

BACKGROUND

1. Field

Forms of the present disclosure relate to a vehicle configured to prevent a collision and a control method thereof.

2. Description of Related Art

A vehicle may be a driving apparatus in order to transfer people and cargo by driving a vehicle wheel, and may be moved on the road.

The vehicle may cause an accident due to a malfunction of the vehicle or an accident may occur due to another vehicle's mistake or a road condition.

Recently, various technologies have been developed to prevent accidents.

For example, a distance detection sensor is mounted to a vehicle to detect an obstacle adjacent to the vehicle and warn a driver of the obstacle. Using the technology, the accident may be prevented in advance.

For another example, in a state in which an electromagnet is mounted to a bumper of a vehicle, when another vehicle is within a certain distance, the vehicle determines it as a collision condition and supplies a power to the electromagnet so that the electromagnet generates a magnetic force. Accordingly, when the vehicle is in the collision situation, the vehicle may be stopped.

The technology is disclosed in Korean Patent Laid-Open Publication No. 2004-0040771.

However, since the vehicle generates a magnetic force without confirming whether an electromagnet is mounted to a first vehicle that is in a collision situation, there may be a problem that causes a greater accident due to the magnetic force when colliding with the first vehicle without the electromagnet.

For another example, as a distance between the vehicle and the first vehicle is closer, a repulsive magnetic force may be increased and thus a large amount of repulsive force may be generated in an opposite direction to a driving direction of the vehicle. Accordingly, due to the larger amount of variation, a strong impact may be applied to a driver and it may cause a secondary collision with a second vehicle.

When the vehicle collides with the first vehicle adjacent to the vehicle, it may take a certain time for a driver of the second vehicle to determine and recognize a condition in which the vehicle is in a quick brake state and the vehicle is stopped due to the collision, and thus it may allow the second vehicle to be involved in a chain collision.

In addition, when the driver of the vehicle cannot send a warning signal because of being incapable of turning on an emergency light due to an injury, the driver of the second vehicle may not recognize the dangerous situation and it may cause a greater accident.

As mentioned above, by an additional secondary collision generated by an external force after the collision of the vehicle, there are many victims.

At the moment of the collision, the driver may be unable to operate a steering system and a brake system of the vehicle for immediate avoidance or for entering a safety state, due to the impact. In addition, the vehicle may be moved in an unwanted direction with the acceleration and give the injury to pedestrians.

SUMMARY

Therefore, it is an aspect of the present disclosure to provide a vehicle capable of detecting the amount of the movement by an external force and automatically controlling a steering, a braking and a damping based on the detected amount of the movement, and a control method thereof.

It is another aspect of the present disclosure to provide a vehicle capable of releasing automatic control of steering, braking, and damping when a command of a user is received during an automatic control, and capable of turning on an emergency light when a command of a user is not received, and a control method thereof.

Additional aspects of the present disclosure will be set forth in part in the description which follows and, in part, will be obvious from the description, or may be learned by practice of the present disclosure.

In accordance with one aspect of the present disclosure, a vehicle includes a chassis; a steering unit configured to change a direction of the chassis; a brake unit configured to adjust a braking force of the chassis; a detector configured to detect movement information of the chassis; and a controller configured to confirm a variation rate of movement of the chassis based on the detected movement information and configured to automatically control an operation of the steering unit and the brake unit when the confirmed variation rate is out of a reference range.

The vehicle may further include a body provided in the chassis and a transmission unit configured to absorb vibration of the body, wherein the controller may control the transmission unit in a hard manner when the confirmed variation rate is out of the reference range.

The detector may include a yaw rate detector configured to detect a yaw rate corresponding to a rotation movement of the chassis and a lateral acceleration detector configured to detect a lateral acceleration corresponding to a lateral movement of the chassis.

The controller may control one side brake of the brake unit based on the detected movement information when the confirmed variation rate is out of the reference range.

The controller may confirm a yaw rate in the movement information when the confirmed variation rate is out of the reference range, confirm a rotation direction of the body based on the confirmed yaw rate, and control a steering angle of the steering unit based on the confirmed yaw rate and rotation direction.

The vehicle may further include a brake pedal configured to receive a braking command from a user and a steering wheel configured to receive a steering command from the user, wherein the controller may release the automatic control when at least one of the braking command or the steering command is received, and may control at least one of the brake unit or the steering unit based on the received at least one of command.

The vehicle may further include an emergency light, wherein the controller may turn on the emergency light when the automatic control is performed.

The controller may turn on the emergency light when at least one of command is not received during the automatic control.

The controller may control the brake unit so that a speed of the vehicle is reduced or stopped when at least one of command is not received during the automatic control.

The vehicle may further include a warning unit configured to output a warning sound wherein the controller may control an operation of the warning unit when the automatic control is performed.

The controller may detect movement information of the chassis during the automatic control, and complete the automatic control based on a variation rate corresponding to the detected movement information.

The controller may recognize a lane during the automatic control, and control driving in the lane based on the recognized lane information.

The controller may recognize a lane when a variation rate of the movement of the chassis is reduced during the automatic control, determine whether the chassis is departed from the lane based on the recognized lane information, and control a steering angle and a braking force again when the chassis is departed from the lane.

The vehicle may further include an image detector configured to detect an image of a road wherein the controller may recognize a lane through performing an image processing on the detected road image.

In accordance with another aspect of the present disclosure, a control method of a vehicle includes detecting a wheel speed and a steering angle of a vehicle; estimating a variation rate of movement of the vehicle based on the detected wheel speed and steering angle; detecting a yaw rate and a lateral acceleration of the vehicle; confirming a variation of real movement of the vehicle based on the detected yaw rate and lateral acceleration; determining whether a collision occurs based on the estimated variation rate and the confirmed variation rate of real movement, and controlling automatically steering and braking when it is determined that the collision occurs.

The determination of whether a collision occurs may include estimating a yaw rate and a lateral acceleration based on the detected wheel speed and steering angle, confirming a reference range corresponding to the estimated yaw rate and lateral acceleration, and determining that the collision occurs when the variation rate of real movement of the vehicle is out of the reference range.

The control method may further include controlling a transmission unit in a hard manner when the variation rate of real movement of the vehicle is out of the reference range.

The control of the steering and the braking may include controlling one side brake and braking force of the brake unit in the variation rate of the real movement; and when the variation rate of the real movement of the vehicle is out of the reference range, confirming the detected yaw rate, confirming a rotation direction of the vehicle based on the confirmed yaw rate, and controlling a steering angle of the steering unit based the confirmed yaw rate and rotation direction.

The control method may further include controlling an operation of the warning unit so that a warning sound is generated when the automatic control is performed.

The control method may further include releasing the automatic control when at least one of a braking command that is through a brake pedal or a steering command that is through a steering wheel is received, and controlling at least one of the brake unit or the steering unit based on the received at least one command.

The control method may further include determining whether at least one command is received when a predetermined time is expired from when the automatic control is started, turning on an emergency light when the at least one command is not received, and controlling the brake unit so that a speed of the vehicle is reduced or stopped.

The control method may further include confirming a variation rate of movement of the chassis during the automatic control and completing the automatic control based on the confirmed variation.

The control method may further include recognizing a lane during the automatic control and controlling driving in the lane based on the recognized lane information.

The control method may further include recognizing a lane when the variation rate of the real movement is reduced during the automatic control; determining whether the vehicle is departed from a lane based on the recognized lane information; and controlling steering and braking again when the vehicle is departed from a lane.

In accordance with another aspect of the present disclosure, a vehicle includes a chassis in which a plurality of wheels and a steering wheel are provided; a steering unit configured to change a direction of the chassis; a brake unit configured to adjust a braking force of the chassis; a transmission unit configured to absorb vibration of a body; a first detector configured to detect a speed of the plurality of wheels and a steering angle of the steering wheel; a second detector configured to a yaw rate and a lateral acceleration of the chassis; and a controller configured to estimate a variation rate of movement of the chassis based on the detected wheel speed and steering angle, configured to confirm a real variation rate of the chassis based on the detected yaw rate and lateral acceleration, configured to determine whether a collision occurs based on the confirmed variation rate and the estimated variation rate, configured to control automatically an operation of at least one of the steering unit, the brake unit and the transmission unit when it is determined that the collision occurs.

The vehicle may further include a brake pedal configured to receive a braking command from a user and a steering wheel configured to receive a steering command from the user, wherein the controller may release the automatic control when at least one of the braking command or the steering command is received, and may control at least one of the brake unit or the steering unit based on the received at least one of command.

BRIEF DESCRIPTION OF THE DRAWINGS

These and/or other aspects of the disclosure will become apparent and more readily appreciated from the following description of embodiments, taken in conjunction with the accompanying drawings of which:

FIG. 4 is an exemplary view of a movement of a vehicle by a collision;

DETAILED DESCRIPTION

The present disclosure will be described more fully hereinafter with reference to the accompanying drawings, in which exemplary embodiments of the disclosure are shown.

Figure 1:
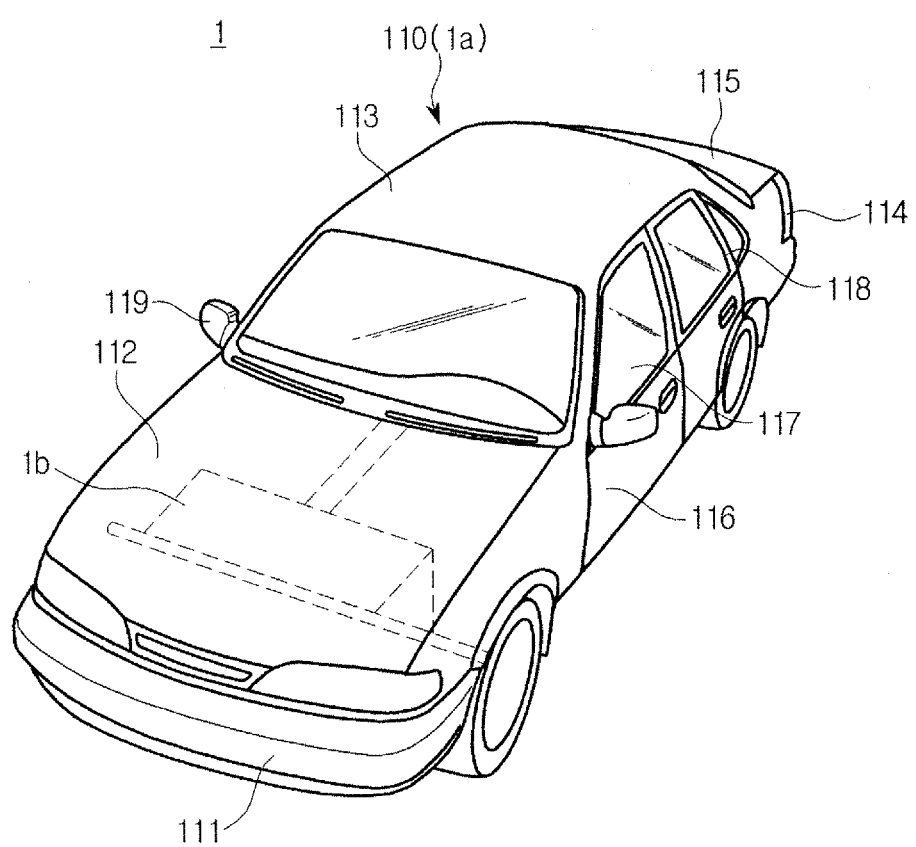
FIG. 1 is an exemplary view of a vehicle.
Figure 2:
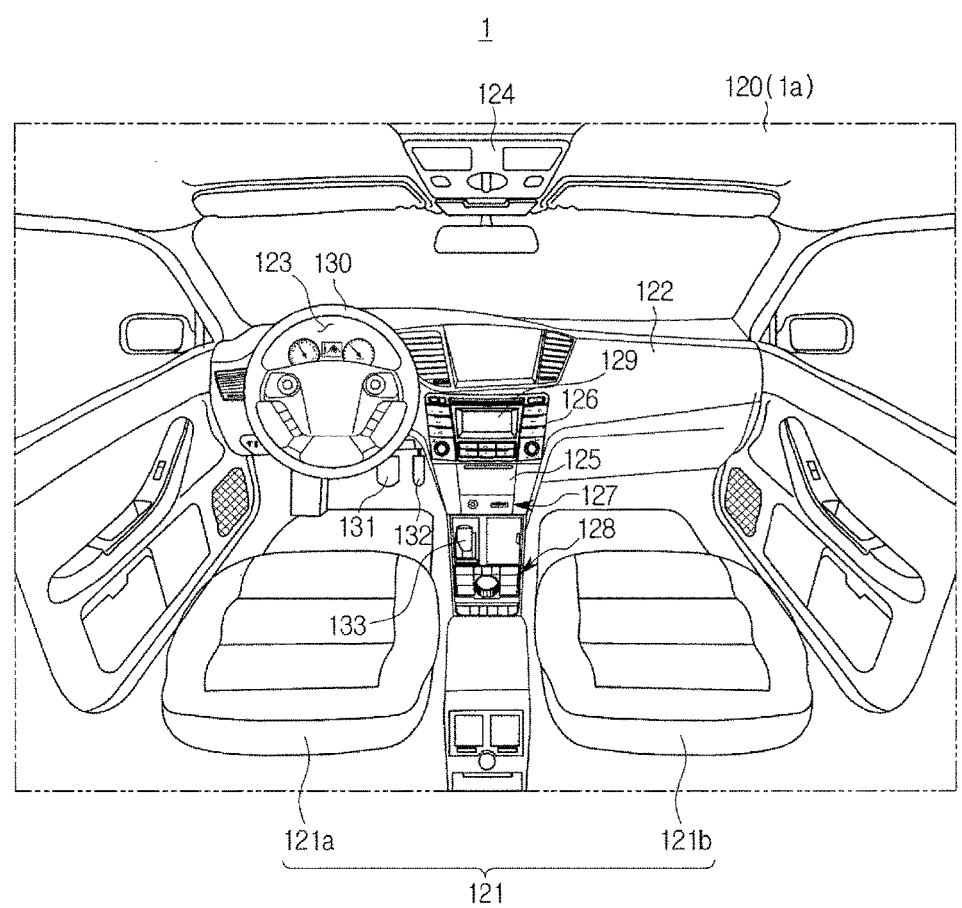
FIG. 2 is an exemplary view of an interior of a vehicle.

FIG. 1 is an exemplary view of a vehicle and FIG. 2 is an exemplary view of an interior of a vehicle.

A vehicle 1 may include a body 1a having an interior and an exterior, and a chassis 1b, which is the rest of the vehicle aside from the body, and in which a mechanical apparatus (e.g. an engine unit, a power transmission unit, a transmission unit, a steering unit, a brake unit) is installed for the driving.

As illustrated in FIG. 1, an exterior 110 of the body may include a front panel 111, a bonnet 112, a roof panel 113, a rear panel 114, a trunk 115, a front, rear, left, and right door 116, and a window glass 117 provided in the front, rear, left, and right door 116 to be openable.

The exterior of the body may further include a pillar 118 provided in the boundary between the front panel, the bonnet, the roof panel, the rear panel, the trunk, and window glasses of the front, rear, left, and right door, and a side mirror 119 providing a view of the rear side of the vehicle 1 to a driver.

As illustrated in FIG. 2, the interior 140 of the body may include a seat 121 on which a passenger is seated, a dashboard 122, an instrument panel that is a cluster, 123, an overhead console 124 in which an interior light, an ON/OFF button of the interior light, and a door open/close button are disposed, and a center fascia 125 in which an operation panel and an outlet of the air conditioning device, and the audio device are installed, wherein the instrument panel may be disposed on the dashboard and may include tachometer, speedometer, coolant temperature indicator, fuel indicator, turn signal indicator, high beam indicator light, warning lights, seat belt warning light, trip odometer, odometer, automatic transmission selector lever indicator, door open warning light, oil warning light, and a low fuel warning light.

The seat 121 may include a driver seat 121a on which a driver is seated, a passenger seat 121b on which a passenger is seated, and a rear seat provide in the rear side of the inside of the vehicle.

In the center fascia 125, a head unit 126 configured to control the audio device, the air conditioning device, and a heater, an air outlet, a cigarette jack, and a multi-terminal 127 may be installed.

The multi-terminal 127 may be disposed adjacent to the head unit 126, and may further include a USB port, an AUX terminal, and a SD slot.

The vehicle 1 may further include an input unit 128 configured to receive an operation command of a variety of functions.

The input unit 128 may be disposed on the head unit 126 and the center fascia 125, and may include at least one physical button such as On/Off button for the variety of functions, and a button to change a set value of the variety of functions.

The input unit 128 may transmit an operation signal of the button to an Electronic Control Unit (ECU), the the head unit 126 or a vehicle terminal.

The input unit 128 may further include a jog dial (not shown) or a touch pad to input a command for moving a cursor and a selecting cursor, wherein the cursor is displayed on a display unit of the terminal.

The input unit 128 may transmit an operation signal of the jog dial or a touch signal that is generated by touching the touch pad, to the ECU, a control unit in the head unit 126 or the vehicle terminal.

The vehicle 1 may further include a display unit 129 configured to display information related to functions that is currently operated, and information input by a user.

The vehicle 1 may display the information related to functions that is currently operated, and information input by the user on the terminal.

The vehicle terminal may be installed on the dash board to be hung.

The vehicle terminal may perform an audio function, a video function, a navigation function, a DMB function and a radio function, and may display an image of the front, rear, left and right side during an autonomous driving mode.

In the inside of the vehicle 1, electronic devices such as a hand-free device, a GPS, an audio device, a bluetooth device, a rear camera, a device for charging terminal device, and a high-pass device may be installed for the convenience of the driver.

The vehicle 1 may further include an ignition button configured to input an operation command to an ignition motor (not shown).

As illustrated in FIG. 2, the chassis of the vehicle includes a steering wheel 130 provided in the inside of the vehicle to be operated by a user and configured to regulate a direction of the vehicle; a brake pedal 131 configured to control the brake of the vehicle; an accelerator pedal 132 configured to control the acceleration of the vehicle; and a transmission lever 133 operated to be any one of parking state (P), driving state (D), reverse driving state (R) and a neutral state (N) by a user so as to control an operation of a gearbox.

The gearbox is a device configured to change a rate between a rotation speed of an engine and a driving gear wheel speed, or change a rotation of a reverse gear.

The steering wheel 130 may be a device configured to regulate a driving direction of the vehicle 1, and may include a rim hold by a user (i.e. a driver) and a spoke connected to the steering unit of the vehicle 1 and configured to connect the rim to a hub of a rotary axis for the steering.

In addition, in the spoke, an input unit (not shown) configured to control a variety of devices, e.g. an audio device, in the vehicle 1 may be provided.

The chassis of the vehicle includes a power generation device, a power transmission device, a steering system, a brake system, a suspension device, a transmission device, a fuel system and front, rear, left and right vehicle wheels that are rotated or stopped by a driving force and a braking force generated by the power generation device, the power transmission device, the driving device, the steering system, the brake system, the suspension device, the transmission device, and the fuel system.

In the chassis of the vehicle 1, a wheel speed detector configured to detect a speed of front, rear, left, and right wheel; a longitudinal acceleration detector configured to detect a longitudinal acceleration of the vehicle; a lateral acceleration detector configured to detect a lateral acceleration of the vehicle; and a yaw rate detector configured to detect a yaw rate of the vehicle may be provided.

In addition, the vehicle 1 may further selectively include a distance sensor configured to detect a distance to an obstacle in the front, rear, left and right direction; an image sensor configured to detect an image of the front, rear, left and right direction and a rain sensor configured to detect whether to rain or an amount of rain.

The distance sensor may include radar sensor or Light detection and Ranging (Lidar) sensor.

The distance sensor may be provided in a way that a single distance sensor is disposed in the center of the front panel 111, or three distance sensors are disposed in the left side, the right side and the center of the front panel 111.

The image sensor may be a camera, and may include a CCD or a CMOS image sensor.

The image sensor may be provided in a front window glass, particularly a window glass inside of the vehicle, in a room mirror inside of the vehicle, or in the roof panel 113 to be exposed to the outside.

The vehicle may further include a variety of safety devices for a driver and passenger safe.

The safety devices of the vehicle may include a variety of safety devices, such as an air bag control device for the safety of the driver and passenger when the collision of the vehicle, and an Electronic Stability Control (ESC) configured to maintain the stability of the vehicle when accelerating or cornering.

The vehicle 1 may include an Electronic Control Unit (ECU) configured to control the operation of the driving unit, the various safety devices and the detectors.

The vehicle 1 may further include a communication unit for the communication between various internal electronic devices of the vehicle 1, and the communication with a user terminal that is an external terminal and a server.

The communication device may include CAN communication module, a Wi-Fi communication module, a USB communication module, and a Bluetooth communication module.

In addition, the communication unit may further include a GPS receiver module to obtain location information from a satellite, and may further include a broadcasting communication module, e.g. DMB, TPEG, SXM, and RDS.

Figure 3:
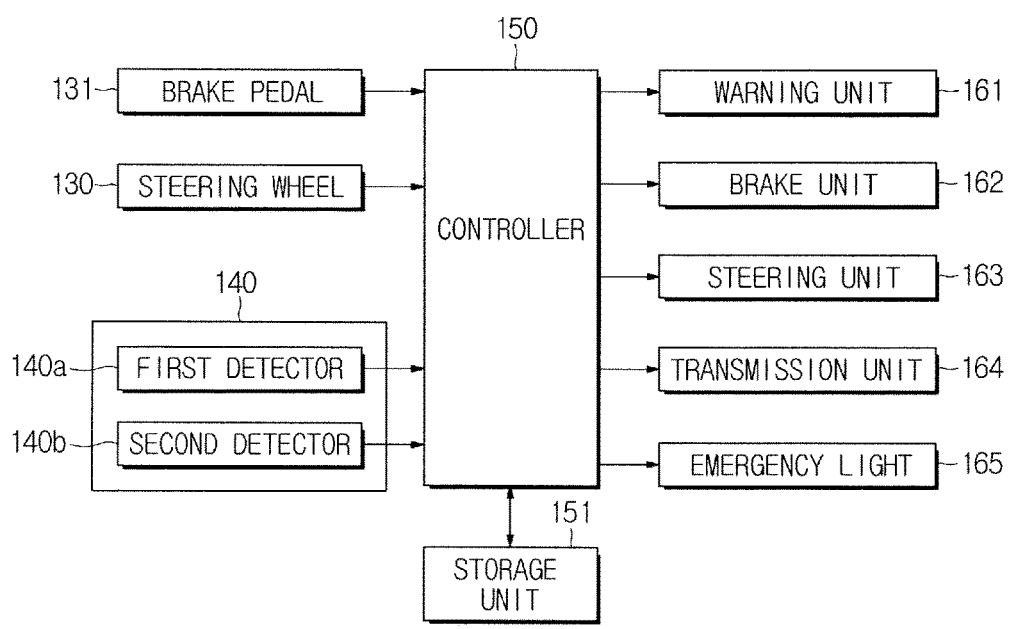
FIG. 3 is a control block diagram of a vehicle.

FIG. 3 is a control block diagram of a vehicle.

When a first collision occurs, a vehicle may perform an autonomous driving to allow a body of the vehicle to be a stable state before being driven by a driver so as to prevent a secondary collision with another vehicle or an obstacle.

Hereinafter another vehicle that is subject to a first collision may be referred to as "a first vehicle" and another vehicle that is subject to a secondary collision may be referred to as "a second vehicle".

The vehicle 1 includes a steering wheel 130, a brake pedal 131, a detector 140, a controller 150, a storage unit 151, and a plurality of driving units 161, 162, 163, 164, and 165.

The steering wheel 130 may be configured to change a driving direction of the vehicle by moving the front left and right wheel of the vehicle, and may be an operation unit to which an intention of a driver is directly applied.

The steering wheel may be a power steering wheel that is easily operated by a user by using a hydraulic pressure and an air pressure.

The power steering wheel may increase a hydraulic pressure in a reservoir by driving a hydraulic pump through the engine, and allow the hydraulic pressure to support a piston's power to rotate the front wheel by opening a hydraulic valve mounted to an end portion of the steering shaft.

The brake pedal 131 is an operation unit configured to allow a hydraulic pressure to be generated by pushing a piston of a master cylinder through a power applied to a push road when pressed by a user.

The detector 140 may be configured to detect movement information of the vehicle and may be disposed in the chassis 1b or the body 1a.

The detector 140 includes a first detector 140a configured to detect movement information of a vehicle by a command of a user and a second detector 140b configured to detect movement information of a vehicle by an external factor.

The external factor may represent a road condition and a collision with an obstacle.

The first detector 140a includes a wheel speed detector configured to detect a speed of front, rear, left, and right wheel; a longitudinal acceleration detector configured to detect a longitudinal acceleration of the vehicle; and a steering angle detector configured to detect a steering angle of the vehicle.

The first detector 140a may detect information related to movement of the vehicle, e.g. a driving speed and a driving direction of the vehicle.

The second detector 140b includes a yaw rate detector configured to detect a yaw rate that is a rate of change of rotation (angular velocity) against a longitudinal axis of a vehicle (i.e. an axis of a direction of gravity) and a lateral acceleration detector configured to detect a lateral acceleration of the vehicle.

The yaw rate detector and the lateral acceleration detector may be integrally formed with each other, or may be formed separately from each other.

The second detector 140b may detect information related to movement of the vehicle, e.g. an angular velocity when the vehicle is rotated with respect to the longitudinal axis and acceleration when the vehicle is moved in a lateral direction of the driving direction.

The detector may further include a distance detector and an image detector.

The distance detector may detect a signal configured to detect an object disposed outside of the vehicle, e.g. a front vehicle driving in the front of the vehicle, a stationary object, e. g. a structure installed around a road, and a vehicle approaching from an opposite lane.

That is, the distance may output a signal corresponding to detecting an object in the front side, the left side, and the right side of the vehicle from a current location of the vehicle, and transmit a signal corresponding to a distance from the detected object to the controller 150 of an object recognition device.

The distance detector may include a LiDAR sensor, an ultrasound sensor or a laser sensor.

The image detector is a device configured to detect information of the object and convert the information into an image signal. For example, the image detector detects information related to an external environment of the vehicle, e.g. a road in which the vehicle is driven and an object in the front side and the lateral side (the left side and the right side), in the current location and transmit image information related to the detected object to the controller 150.

The image detector may include a front camera to obtain an image of the front side of the vehicle, and may include at least one of a left camera and a right camera to obtain an image of the left side and the right side of the vehicle, and a rear camera to obtain an image of the rear side of the vehicle.

The controller 150 may receive operation information from at least one of the steering wheel 130, the brake pedal 131, the accelerator pedal 132 and the transmission lever 133, and may control a driving direction and a driving speed of the vehicle based on the received operation information.

Particularly, the controller 150 may control the driving direction of the vehicle based on operation information of the steering wheel 130 when the transmission lever 133 is operated to be the driving state (D) and the reverse driving state (R), and may control a rotation speed of a plurality of wheels of the vehicle based on the operation information of the brake pedal 131 and the accelerator pedal 132.

The controller 150 may receive movement information detected by the detector 140 in a state in which the vehicle is in the parking state and the driving state, determine whether the collision of the vehicle occurs based on the received movement information, and control the performance of automatic control of the vehicle based on a result of the determination of the collision of the vehicle.

Particularly, the controller 150 may receive speed information of a plurality of wheels and longitudinal acceleration information, and confirm information related to speed difference between the front left wheel and the front right wheel, and between the rear left wheel and the rear right wheel, among the received speed information of the plurality of wheels, and estimate a yaw rate of the vehicle by using the confirmed information of speed difference and the longitudinal acceleration information.

In addition, the controller 150 may obtain an acceleration of the vehicle based on the variation amount of speed of front, rear, left and right wheels.

The controller 150 may estimate a lateral acceleration of the vehicle based on the received information of speed of the plurality of wheels and steering angle information.

The controller 150 may set a reference range to determine whether it is a collision state or a standard state, based on the estimated yaw rate and lateral acceleration.

The reference range may represent a variation rate range in which a yaw rate and a lateral acceleration of the vehicle in the standard state vary.

That is, the reference range may include a range of variation rate of a yaw rate in which a yaw rate varies according to a steering angle and a wheel speed, and a range of variation rate of a lateral acceleration in which a lateral acceleration varies, when the vehicle is driven and may include a range of variation rate of a yaw rate in which a yaw rate varies, and a range of variation rate of a lateral acceleration in which a lateral acceleration varies, when the vehicle is parked and stopped.

The controller 150 may receive yaw rate information and lateral acceleration information detected by the second detector, confirm a variation rate of the yaw rate and the variation rate of the lateral acceleration based on the received yaw rate information and lateral acceleration information, and determine whether the collision occurs by confirming whether at least one of the confirmed variation rate of yaw rate and variation rate of lateral acceleration is within the reference range.

A description thereof will be described with reference to FIG. 4.

As illustrated in FIG. 4, when the vehicle is straightly driven in a standard state, the rotation in the longitudinal axis and the movement in the lateral direction may hardly occur, and when the collision occurs, at least one of the rotation in the longitudinal axis and the movement in the lateral direction may occur.

When the vehicle is in the standard state, a lateral acceleration, which is equal to or less than a certain level, may be detected by the lateral acceleration detector, and a yaw rate (yr1), which is equal to or less than a certain level, may be detected by the yaw rate detector. The movement information may have a variation rate that is equal to or less than a certain level, as time passes.

However, when the collision of the vehicle occurs, the vehicle may be moved by an external force, particularly rotated with respect to the longitudinal axis or moved to the lateral sides.

In this case, according to the collision position and the size of collision force, a rotation direction and angle with respect to the longitudinal axis, and a movement direction and distance to the lateral sides may vary.

When the collision of the vehicle occurs, at least one of the variation rate of the lateral acceleration and the yaw rate (yr2) may be increased over a certain level.

Therefore, the controller 150 may determine whether the collision occurs by using information detected by the lateral acceleration detector and the yaw rate detector.

In addition, the yaw rate may represent an angular velocity and have a vector quantity indicating a rotation speed and a rotation direction of the vehicle. That is, the controller 150 may obtain the rotation direction of the chassis from the movement information detected by the second detector.

When the confirmed variation rate of the yaw rate is out of the reference range or the confirmed variation rate of lateral acceleration is out of the reference range, the controller 150 may determine that the collision occurs and then perform the automatic control.

In this case, the automatic control may represent controlling automatically a steering unit, a brake unit and a transmission unit so that the vehicle becomes a stable state.

When the confirmed variation rate is out of the reference range, the controller 150 may confirm the yaw rate detected by the yaw rate detector, confirm a rotation direction of the chassis based on the confirmed yaw rate, and control a steering of the steering unit based on the confirmed yaw rate and rotation direction.

For example, when it is determined that the chassis is being rotated clockwise, the controller 150 may control the rotation direction of the wheel so that the rotation direction of the wheel is to be counterclockwise, control a braking force so that the braking force of the left wheel is to be larger than a braking force of the right wheel, and control a plurality of dampers in a hard manner.

The controller 150 may control the size of the braking force and the steering angle based on the variation rate of the yaw rate and lateral acceleration during the automatic control.

The controller 150 may output a warning sound by controlling a warning unit when the confirmed variation rate is out of the reference range. By the warning sound, it may be possible to allow a user to recognize that an automatic control is performed for preventing a secondary collision.

The controller 150 may determine whether at least one of a steering wheel operation command from a user and a brake pedal operation command from a user is received or not, during the automatic control, and when it is determined that at least one of the operation commands is received, the controller 150 may release the automatic control, and control the brake system and the steering system based on the received at least one of the operation command.

The controller 150 may control turning an emergency light on when it is determined that at least one of the operation commands is not received within a predetermined period of time from when the automatic control is started.

By controlling the emergency light, it may be possible to allow a user to recognize an emergency situation.

The controller 150 may control the brake system so that the vehicle is stopped or a speed of the vehicle is reduced when it is determined that at least one of the operation commands is not received within a predetermined period of time from when the automatic control is started.

During the automatic control, the controller 150 may recognize a lane, and then control the brake system and the steering system based on the recognized lane information so that the vehicle is driven in the lane.

The recognition of the lane may include recognizing whether the vehicle is departed from the lane or not based on the variation rate of the lateral acceleration and the yaw rate detected by the second detector.

In addition, the recognition of the lane may include recognizing a lane by processing an image detected by the image detector.

The controller 150 may determine whether the vehicle is in a stable state during an automatic control.

The determination of the stable state may include determining a variation rate of a real movement of the vehicle and whether the vehicle is departed from a lane.

Particularly, the controller 150 may receive movement information detected by the second detector during the automatic control, confirm a variation rate of the yaw rate and the lateral acceleration based on the received movement information, and complete the automatic control when the confirmed variation rate is reduced to be equal to or less than a predetermined variation rate.

The controller 150 may recognize a lane when the confirmed variation rate is reduced to be equal to or less than a predetermined variation rate, determine whether the vehicle is departed from the lane based on the recognized lane information, and control the steering system and the brake system when it is determined that the vehicle is departed from the lane.

Through this control, the controller 150 may control a position of the vehicle so that the vehicle becomes a state to allow a user to drive the vehicle.

The controller 150 may allow the vehicle to be moved to a safe zone when it is determined that the vehicle is departed from the lane.

The controller 150 may calculate each difference of variation rate of lateral acceleration and yaw rate by comparing an estimated variation rate of lateral acceleration and yaw rate with a variation rate of lateral acceleration and yaw rate caused by the collision, and determine whether the vehicle is in the stable state or not based on the reduction of the calculated difference.

That is, the controller 150 may determine the stable state of the vehicle depending on whether the difference of the variation rate of the lateral acceleration is reduced or not, and the difference of the variation rate of the yaw rate is reduced or not.

The controller 150 may obtain a current speed of the vehicle based on the speed of the plurality of wheels, estimate a longitudinal acceleration of the vehicle based on the obtained speed of the vehicle and the operation information of the accelerator pedal, and determine whether a collision occurs or not based on the estimated longitudinal acceleration and longitudinal acceleration information detected by the longitudinal acceleration detector.

The controller 150 may determine a safe zone based on detection information by the distance detector and the image detector at a time of collision determination.

In addition, the controller 150 may recognize whether another vehicle is driven in a lane in which the vehicle is driven or in an adjacent lane to the lane based on the detection information by the distance detector and the image detector at a time of collision determination, and then control a steering angle and a baking force. Accordingly, the vehicle may be moved to a safe lane to be driven.

The controller 150 may determine whether an automatic control is needed or not based on the detected variation rate of lateral acceleration and yaw rate.

That is, although the detected variation rate of lateral acceleration and yaw rate is out of the reference range, the controller 150 may allow collision information to be outputted when the variation rate of lateral acceleration and yaw rate is within a first range, and the controller 150 may determine that an automatic control is needed and perform the automatic control when the variation rate of lateral acceleration and yaw rate is within a second range that is larger than the first range.

The storage unit 151 may store information related to a predetermined time to turn on the emergency light.

The storage unit 151 may store a reference range corresponding to the estimated variation rate of lateral acceleration and yaw rate, and control information of braking force, steering angle and damping corresponding to the detected variation rate of lateral acceleration and yaw rate.

The plurality of driving units 161, 162, 163, 164 and 165 may be configured to stabilize a body of the vehicle to prevent a secondary collision and may include a warning unit 161, a brake unit 162, a steering unit 163, a transmission unit 164, and an emergency light 165.

The warning unit 161 may output a warning sound based on a command of the controller 150.

The warning unit 161 may include a speaker disposed inside of the vehicle.

The brake unit 162 may generate a braking force in the plurality of wheels based on a command of the controller 150.

The brake unit 162 may include a master cylinder, a wheel cylinder and a brake shoe or pad.

The brake unit 162 may transmit hydraulic pressure generated in the master cylinder to each wheel cylinder evenly, compress a drum or a disk by transmitting the hydraulic pressure to the brake shoe or pad by using the wheel cylinder and then generate a braking force by rubbing an inside or an outside of the brake shoe or the pad.

The steering unit 163 may respectively rotate the plurality of wheels according to a command of the controller 150.

The steering unit 163 may rotate the front left and right wheels among the plurality of wheels.

The steering unit 163 may rotate all of the front, rear, left and right wheels.

The steering unit 163 may develop a rotation force while changing a direction of the steering force.

The transmission unit 164 may be a damper configured to absorb a vibration, and may have a function of absorbing an impact generated in a road surface and a function of grounding a tire to the road surface to prevent the impact from being directly delivered to the body of the vehicle or the passenger.

The transmission unit 164 may be provided between the front left and right wheel and the body of the vehicle, between the rear left and right wheel and the body of the vehicle, or the body of the vehicle and the front, rear, left and right wheels, respectively.

The transmission unit 164 may control each damper in a hard or soft manner according to a command of the controller 150.

The emergency light 165 may be a lamp provided in the outside of the vehicle, and may be turned on according to a command of the controller 150. Through this, an emergency situation may be informed to people in the outside.

Figure 5:
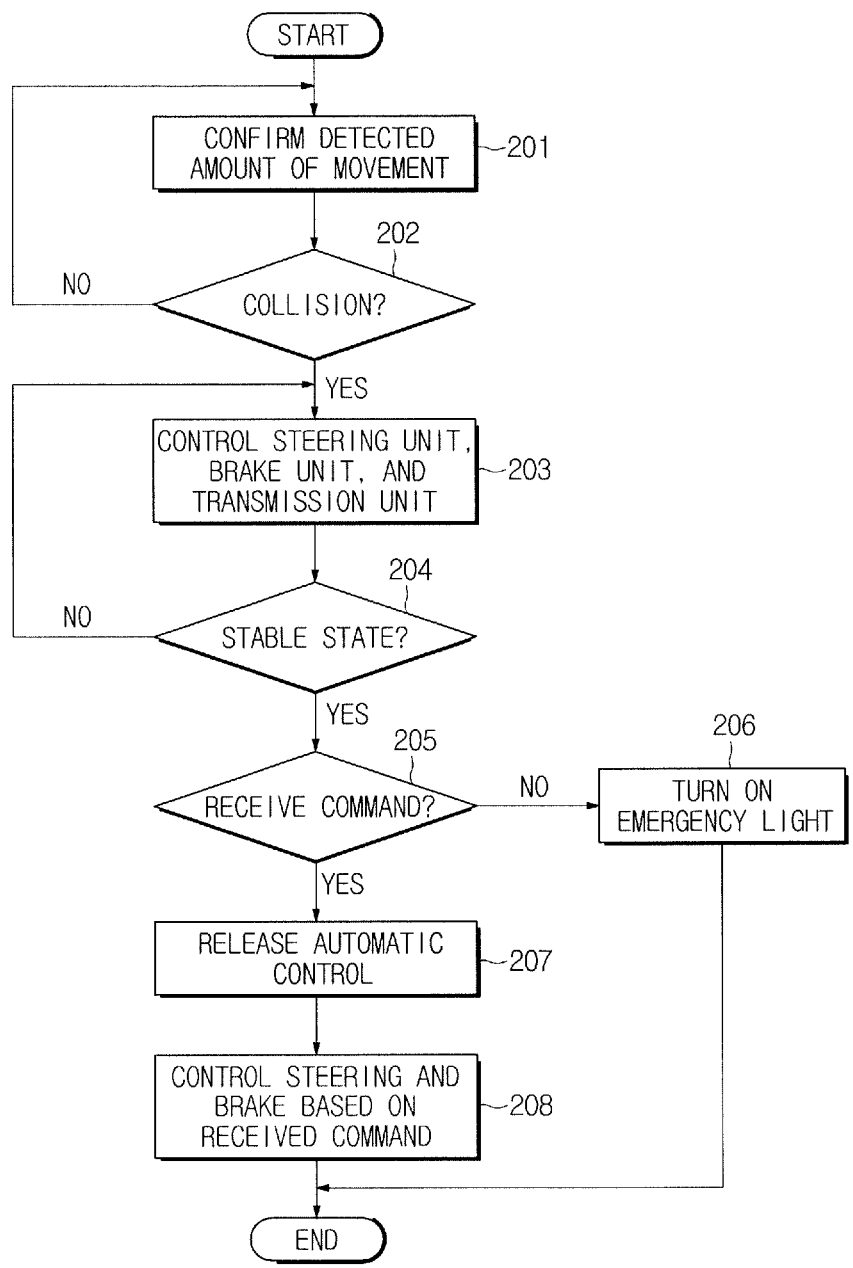
FIG. 5 is a flow chart of a vehicle.

FIG. 5 is a flow chart of a vehicle. It will be described with reference to FIGS. 6 to 9.

The vehicle may control the driving direction of the vehicle based on operation information of the steering wheel 130 when the transmission lever 133 is operated to be the driving state (D) and the reverse driving state (R), and may perform a driving while controlling a rotation speed of the plurality of wheels of the vehicle based on the operation information of the brake pedal 131 or the accelerator pedal 132.

The vehicle may confirm movement information detected by the detector 140 in a state in which the vehicle is in a stopping and parking state, and a driving state (201), and determine a state of the vehicle based on the confirmed movement information.

The vehicle may confirm information related to speed difference between the front left wheel and the front right wheel, and between the rear left wheel and the rear right wheel, among information of the plurality of wheels detected by the first detector, estimate a yaw rate of the vehicle by using the confirmed information of speed difference and longitudinal acceleration information, and estimate a lateral acceleration of the vehicle based on the speed information of the plurality of wheels and the steering angle information.

The vehicle may set a reference range to determine whether it is a collision state or a standard state, based on the estimated yaw rate and lateral acceleration.

The reference range may include a range of variation rate of a yaw rate in which a yaw rate varies according to a steering angle and a wheel speed, and a range of variation rate of a lateral acceleration in which a lateral acceleration varies, when the vehicle is driven, and may include a range of variation rate of a yaw rate in which a yaw rate varies, and a range of variation rate of a lateral acceleration in which a lateral acceleration varies, when the vehicle is parked and stopped.

The vehicle may confirm a variation rate of the yaw rate and the variation rate of the lateral acceleration based on the yaw rate information and lateral acceleration information detected by the second detector, and may determine whether the collision occurs by confirming whether at least one of the confirmed variation rate of yaw rate or variation rate of lateral acceleration is within the reference range (202).

The vehicle may determine that a collision occurs when the confirmed variation rate of the yaw rate is out of the reference range or the confirmed variation rate of the lateral acceleration is out of the reference range, and may automatically control the steering unit, the brake unit, and the transmission unit to be a stable state (203).

The vehicle may confirm a yaw rate detected by the yaw rate detector when the confirmed variation rate is out of the reference range, confirm a rotation direction of the body based on the confirmed yaw rate, and control a steering angle of the steering unit based on the confirmed yaw rate and rotation direction.

That is, the vehicle may change a rotation direction of the wheel.

The vehicle may control a braking force of the plurality of wheels based on the yaw rate detected by the yaw rate detector and the lateral acceleration detected by the lateral acceleration detector, and may control the damper connected to the plurality of wheels.

The vehicle may control the size of the braking force or the size of the steering angle based on the variation rate of the yaw rate and lateral acceleration.

The vehicle may output a warning sound during the automatic control. Through this, it may be informed to a user that the automatic control is performed for the prevention of the secondary collision.

Figure 6:
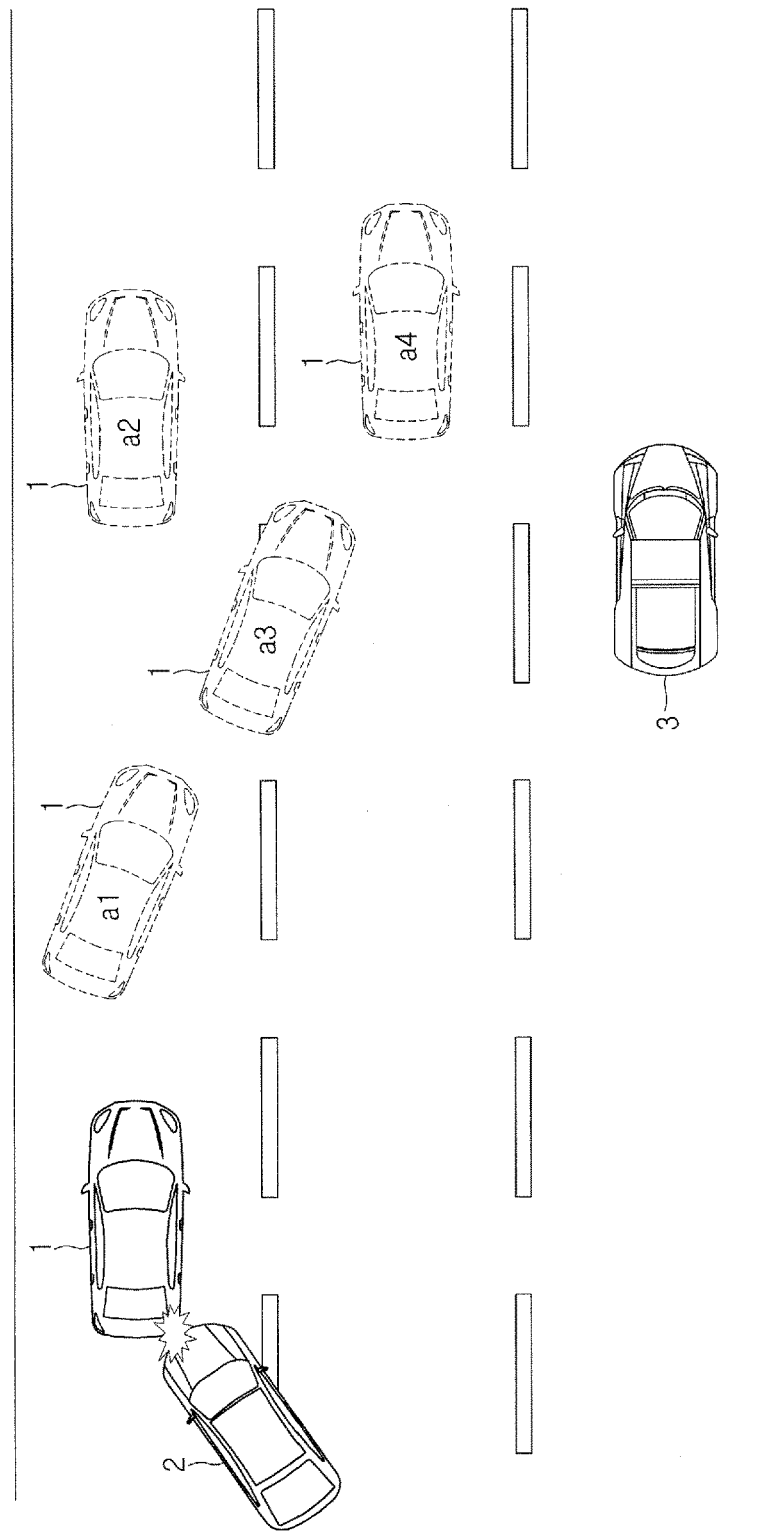
FIG. 6 is an exemplary view of an automatic control to prevent a secondary collision of a vehicle.

A detailed description thereof will be described with reference to FIG. 6.

The vehicle 1 may be moved to a position (a1), which is different from a position desired by a user, by an external force by an impact when a collision with a second vehicle 2 occurs.

The vehicle 1 may change a steering direction to the left side when the vehicle 1 is in a state of being moved to the right side by the external force, and control a braking force so that a braking force of the left wheel is larger than a braking force of the right wheel and thus the body of the vehicle is moved to the left side.

In this case, the vehicle may control the transmission unit in a hard manner to support the braking force.

That is, when the vehicle is moved to a first position (a1) by the external force, the vehicle may be moved to a second position (a2) through the automatic control so that the vehicle may be stayed in the lane currently driven, and a secondary collision with a third vehicle may be prevented.

When the vehicle 1 is moved to a third position (a3) of another road or another lane due to a large external force by an impact caused by a collision with the second vehicle 2, the vehicle may be moved to the second position (a2) or a fourth position (a4) by performing an automatic control based on driving information of another vehicle in an adjacent lane.

That is, the vehicle may determine whether there is another vehicle is in a lane adjacent to the lane, in which the vehicle is currently driven, based on information of the distance detector or the image detector, perform an automatic control to be driven in the current lane when it is determined that there is another vehicle in a lane adjacent to the lane, in which the vehicle is currently driven, and perform an automatic control to be driven in anther lane when it is not determined that there is another vehicle in a lane adjacent to the lane, in which the vehicle is currently driven.

Figure 7:
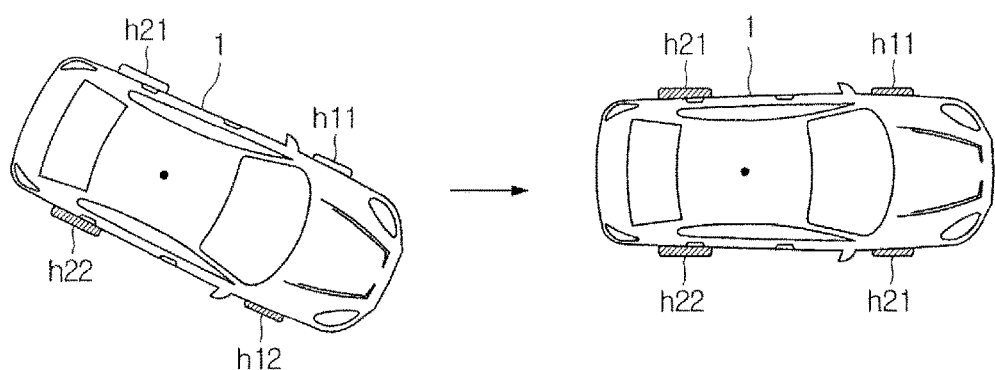
FIG. 7 is an exemplary view of one side brake during an automatic control to prevent a secondary collision of a vehicle.

As illustrated in FIG. 7, when the vehicle 1 is moved to the right side by an external force, the vehicle 1 may change a steering direction to the left side, and control a braking force so that a braking force of the left wheel h11 and h21 is larger than a braking force of the right wheel h12 and h22 and thus the body of the vehicle is moved to the left side. In addition, depending on the second position (a2) or the fourth position (a4), the vehicle may control the size of the steering angle and the size of the braking force, and may control a point of time of controlling the size of the steering angle and the size of the braking force.

In this case, the vehicle may control the transmission unit in a hard manner to support the braking force.

In addition, in order to determine the possibility of departing the driving lane, a variation rate of yaw rate and lateral acceleration may be determined in advance through an experiment.

Figure 8:
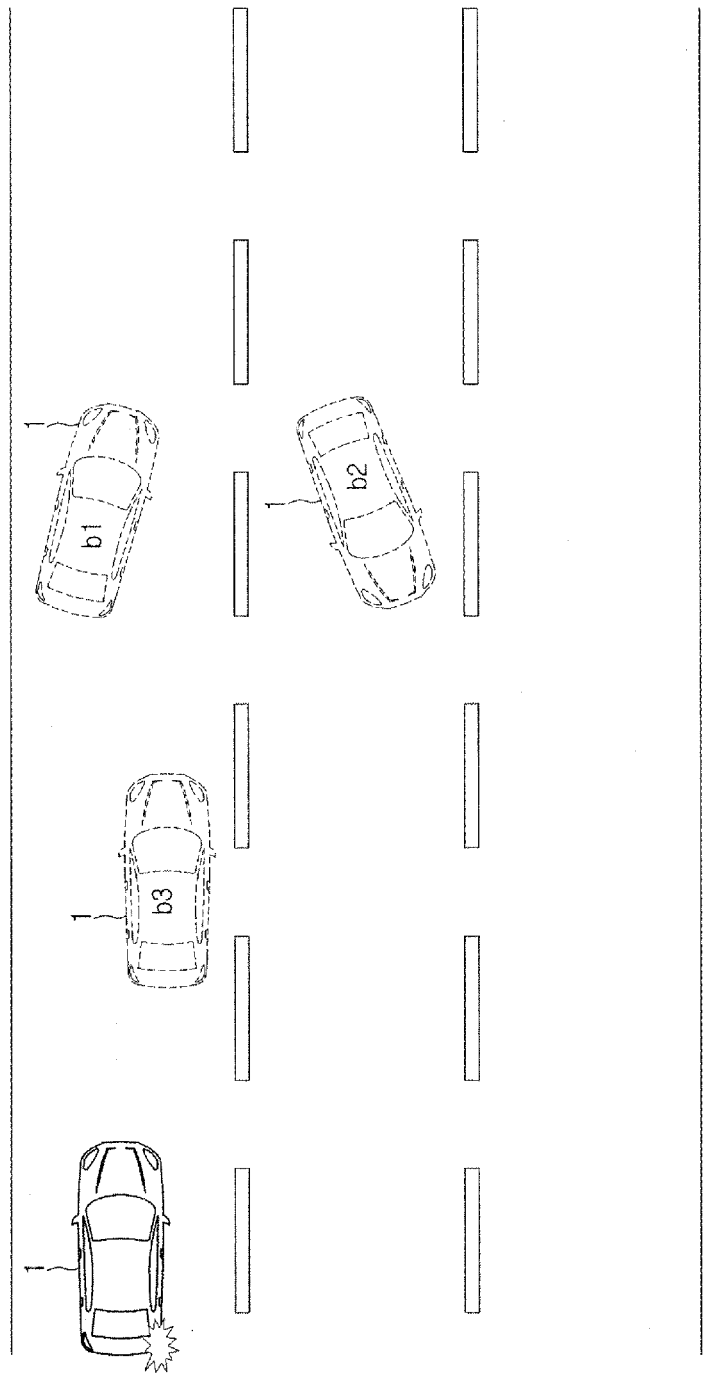
FIG. 8 is an exemplary view of an automatic control to prevent a secondary collision of a vehicle.

As illustrated in FIG. 8, when the vehicle is placed in a direction (b2) opposite to a driving direction since the body of the vehicle is rotated by a collision with another vehicle, the vehicle may be moved in the same direction as a moving direction by an impact.

For example, when it is determined that the body thereof is rotated with 180 degree, the vehicle may control a rotation direction of the wheel so that the rotation direction is to be clockwise, control a braking force so that a braking force of the right wheel is larger than a braking force of the left wheel, and control the plurality of dampers in a hard manner.

That is, the vehicle may differently control the braking force and the steering angle according the position of the vehicle after the collision occurs.

The vehicle may determine whether the vehicle is in a stable state during the automatic control (204) and may control the steering unit, the brake unit and the transmission unit again when it is determined that the vehicle is not in the stable state.

The determination of the stable state may include determining a variation rate of a real movement of the vehicle and whether the vehicle is departed from a lane.

That is, the vehicle may receive movement information detected by the second detector during the automatic control, confirm a variation rate of the yaw rate and the lateral acceleration based on the received movement information, and recognize a lane when the confirmed variation rate is reduced to be equal to or less than a predetermined variation rate.

In this case, the vehicle may determine whether the vehicle is departed from the lane based on the recognized lane information. The vehicle may determine that the vehicle is in a stable state when it is determined that the vehicle is not departed from the lane, and may determine that the vehicle is in an unstable state when it is determined that the vehicle is departed from the lane. In the case in which the vehicle is in the unstable state, the vehicle may control the steering and the braking again to be moved to a lane in which the vehicle is allowed to be driven.

Through this control, the vehicle may control a position of the vehicle so that the vehicle becomes a state to allow a user to drive the vehicle.

The recognition of the lane may include recognizing a lane by processing an image detected by the image detector.

In a state in which it is determined that the vehicle is in the stable state, the vehicle may determine whether at least one of an operation command of the steering wheel and an operation command of the brake pedal is received from a user (205).

The vehicle may turn on an emergency light when it is determined that at least one of the operation commands is not received within a predetermined period of time from when it is determined that the vehicle is in the stable state (206).

In addition, the vehicle may turn on an emergency light when it is determined that at least one of the operation commands is not received within a predetermined period of time from when the automatic control is started.

By controlling the emergency light, it may be possible to allow a user to recognize an emergency situation.

The vehicle may control the brake unit so that the vehicle is stopped or a speed of the vehicle is reduced when it is determined that at least one of the operation commands is not received within a predetermined period of time.

The vehicle may release the automatic control when it is determined that at least one operation command is received from when it is determined that the vehicle is in the stable state (207), and may control the brake unit and the steering unit based on the received at least one operation command so that the vehicle may be driven according to the intension of the user.

Figure 9:
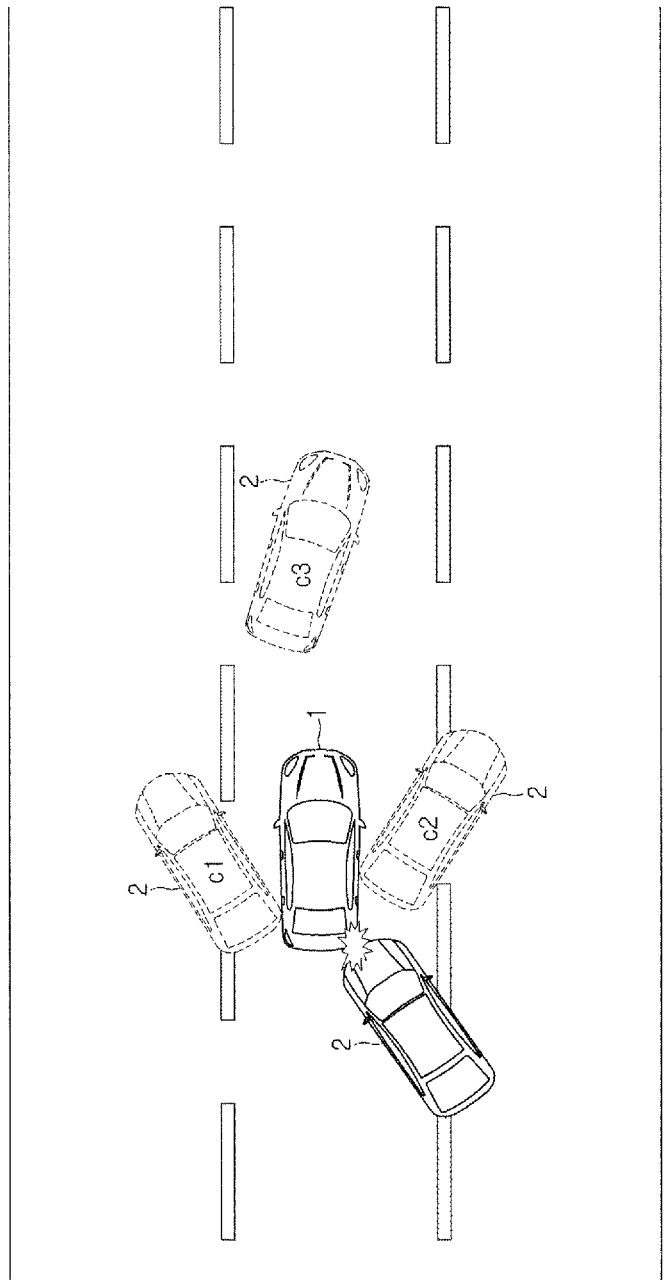
FIG. 9 is an exemplary view of an automatic control to prevent a secondary collision of a vehicle.

As illustrated in FIG. 9, as for the second vehicle 2 that applies an external force to the first vehicle 1, when the second vehicle 2 is moved to a first position (c1) or a second position (c2) since a variation rate of lateral acceleration and yaw rate is out of the reference range, the second vehicle 2 may control the brake unit, the transmission unit and the steering unit based on the detected variation rate of lateral acceleration and yaw rate to be moved a position (c3) of a lane that is intended to be driven.

The second vehicle 2 that applies an external force to the first vehicle 1 may determine a position of a lane that is intended to be driven based on information detected by at least one of the distance detector and the image detector, and may control the barking unit, the steering unit and the transmission unit to be moved to the determined position.

Figure 10:
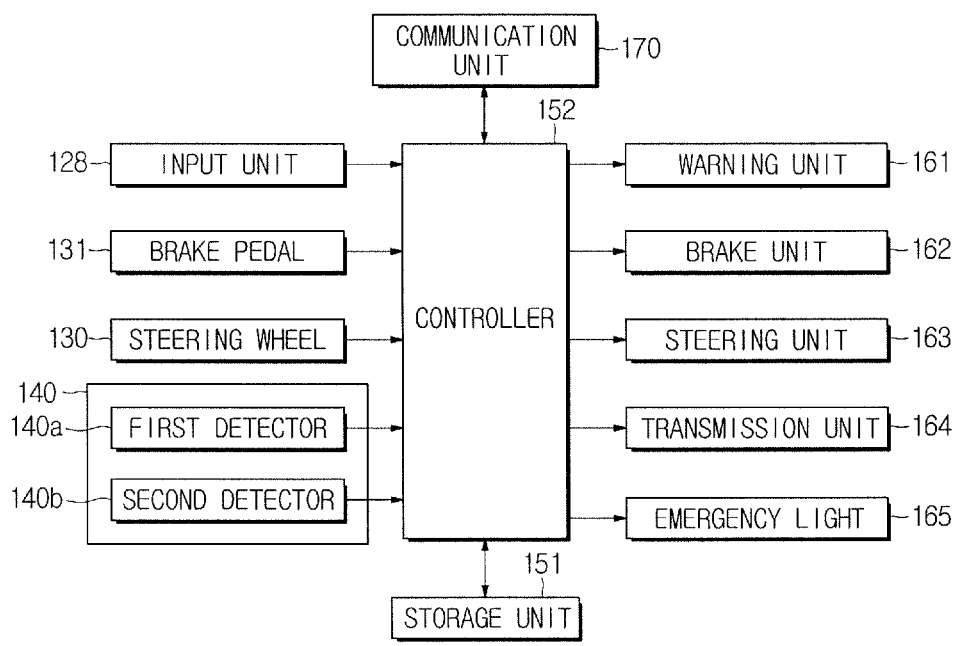
FIG. 10 is a control block diagram of a vehicle.

FIG. 10 is a control block diagram of another form of a vehicle. The vehicle may include a steering wheel 130, a brake pedal 131, a detector 140, a controller 152, a storage unit 151 and a plurality of driving units 161, 162, 163, 164, and 165, and may further include an input unit 128 and a communication unit 170.

Since the steering wheel 130, the brake pedal 131, the detector 140, the controller 152, the storage unit 151 and the plurality of driving units 161, 162, 163, 164, and 165 will be the same as those described above, and thus a description thereof will be omitted.

The controller in accordance with another embodiment is the same as shown in in an embodiment of the present disclosure and thus a description thereof will be omitted.

The input unit 128 may receive a communication command configured to communicate with another vehicle and a server.

The input unit 128 may receive an automatic control mode to prevent a secondary collision.

The controller 152 may control a communication with another vehicle and a server during the vehicle is in a driving state and a parking/stopping state.

When a collision occurs, the controller 152 may perform an automatic control and allow information related to the collision to be transmitted by controlling the communication unit 170 so as to prevent a secondary collision.

When a collision occurs, the controller 152 may receive information related to a position of adjacent another vehicle by a communication with another vehicle and a server, and may perform an automatic control based on the received information.

In addition, the controller 152 may allow collision information to be outputted when the variation rate of the lateral acceleration and the yaw rate is included in a first range although the detected variation rate of the lateral acceleration and the yaw rate is out of the reference range, control the transmission of the accident information through the communication unit, and perform an automatic control when the variation rate of the lateral acceleration and the yaw rate is included in a second range larger than the first range.

The communication unit 170 that is configured to perform a wires communication with another vehicle and a server may receive road information from another vehicle and a server and transmit information of the vehicle according to a command of the controller.

As is apparent from the above description, according to the proposed vehicle and control method thereof, when a collision occurs, the vehicle instead of a driver may automatically perform at least one of steering control, side braking control, and a damping control, and thus a secondary collision may be prevented, the incidence of additional injury may be reduced, the speed of the vehicle may be stably reduced or stopped, and the vehicle may be moved to a safe lane so that a stabilization time of the vehicle may be reduced.

By generating a warning sound, it may be allowed an automatic control state to be informed to a driver, and it may be allowed a driver to recognize whether an automatic control is stopped.

In a state in which the vehicle is automatically controlled to be a stable state, when the vehicle is operated by a driver, the automatic control may be released and thus the driver may directly operate the vehicle at a desired time.

By automatically turning on an emergency light when an operation is not performed since a driver is unconscious, a chain collision and a secondary collision may be prevented by warning another vehicle's driver.

Although an operation is not performed since a driver is unconscious, the speed of the vehicle may be reduced and then the vehicle may be stopped and moved to a safe zone.

The quality and the marketability of the vehicle having a function of preventing a secondary collision may be improved, a user satisfaction may be increased, the user convenience and the safety of the vehicle may be enhanced, and the competitiveness of the vehicle may be secured.

Although a few embodiments of the present disclosure have been shown and described, it would be appreciated by those skilled in the art that changes may be made in these embodiments without departing from the principles and spirit of the disclosure, the scope of which is defined in the claims and their equivalents.

DESCRIPTION OF SYMBOLS

1: vehicle
2: first vehicle
3: second vehicle
140: detector
150: controller
152: controller

What is claimed is:

1. A vehicle comprising:
   a chassis;
   a steering unit configured to change a direction of the chassis;
   a brake unit configured to adjust a braking force of the chassis;
   a detector configured to detect movement information of the chassis; and
   a controller configured to:
      confirm a variation rate of movement of the chassis based on the detected movement information;
      control an automatic control of the steering unit and the brake unit when the confirmed variation rate is out of a reference range;
      confirm a yaw rate in the movement information when the confirmed variation rate is out of the reference range;
      confirm a rotation direction of the body based on the confirmed yaw rate; and
      control a steering angle of the steering unit to steer the vehicle to a determined safe zone based on the confirmed yaw rate and rotation direction.

2. The vehicle of claim 1 further comprising:
   a body provided in the chassis; and
   a transmission unit configured to absorb vibration of the body, wherein the controller controls the transmission unit in a hard manner when the confirmed variation rate is out of the reference range.

3. The vehicle of claim 1 wherein the detector comprises a yaw rate detector configured to detect a yaw rate corresponding to a rotation movement of the chassis and a lateral acceleration detector configured to detect a lateral acceleration corresponding to a lateral movement of the chassis.

4. The vehicle of claim 1 wherein the controller controls one side brake of the brake unit based on the detected movement information when the confirmed variation rate is out of the reference range.

5. The vehicle of claim 1 further comprising:
   a brake pedal configured to receive a braking command from a user; and
   a steering wheel configured to receive a steering command from the user, wherein the controller is configured to release the automatic control when at least one of the braking command or the steering command is received, and to control at least one of the brake unit or the steering unit based on the received at least one of command.

6. The vehicle of claim 5 further comprising:
   an emergency light, wherein the controller is configured to turn on the emergency light when the automatic control is performed.

7. The vehicle of claim 6 wherein the controller is configured to turn on the emergency light when the at least one command is not received during the automatic control.

8. The vehicle of claim 7 wherein the controller is configured to control the brake unit so that a speed of the vehicle is reduced or stopped when the at least one command is not received during the automatic control.

9. The vehicle of claim 1 further comprising:
   a warning unit configured to output a warning sound, wherein the controller is configured to control an operation of the warning unit when the automatic control is performed.

10. The vehicle of claim 1 wherein the controller is configured to detect movement information of the chassis during the automatic control, and to complete the automatic control based on a variation rate corresponding to the detected movement information.

11. The vehicle of claim 1 wherein the controller is configured to recognize a lane during the automatic control, and to control driving in the lane based on the recognized lane information.

12. The vehicle of claim 1 wherein the controller is configured to recognize a lane when a variation rate of the movement of the chassis is reduced during the automatic control, to determine whether the chassis is departed from the lane based on the recognized lane information, and to control a steering angle and a braking force again when the chassis is departed from the lane.

13. The vehicle of claim 11 further comprising: an image detector configured to detect an image of a road, wherein the controller is configured to recognize a lane through performing an image processing on the detected road image.

* * * * *